(12) United States Patent  
Smadi

(10) Patent No.: US 8,761,228 B2  
(45) Date of Patent: Jun. 24, 2014

(54) CO-EXISTENCE OF NARROW-CHANNEL TRANSMITTER AND WIDE-CHANNEL RECEIVER

(75) Inventor: Mohammed Nawaf Smadi, Ancaster (CA)

(73) Assignee: BlackBerry Limited, Waterloo, Ontario (CA)

( * ) Notice: Subject to any disclaimer, the term of this patent is extended or adjusted under 35 U.S.C. 154(b) by 295 days.

(21) Appl. No.: 12/954,803

(22) Filed: Nov. 26, 2010

(65) Prior Publication Data

US 2012/0134390 A1    May 31, 2012

(51) Int. Cl.  
*H04B 1/00*    (2006.01)

(52) U.S. Cl.  
USPC ........... 375/135; 375/133; 375/130; 375/136; 375/132; 375/219; 375/295; 375/316

(58) Field of Classification Search  
CPC .............. H04W 88/06; H04W 72/082; H04W 72/1215; H04W 72/08; H04W 72/04; H04B 15/00; H04B 1/1027; H04B 1/713  
USPC ......... 375/133, 135, 130, 136, 132, 219, 295, 375/316  
See application file for complete search history.

(56) References Cited

U.S. PATENT DOCUMENTS

| | | | |
|---|---|---|---|
| 2006/0292988 A1* | 12/2006 | Yuen et al. | 455/62 |
| 2007/0070961 A1 | 3/2007 | Tao | |
| 2007/0298810 A1* | 12/2007 | Kasher et al. | 455/452.1 |
| 2008/0205365 A1* | 8/2008 | Russell et al. | 370/341 |
| 2008/0279138 A1 | 11/2008 | Gonikberg et al. | |
| 2008/0279264 A1* | 11/2008 | Desai et al. | 375/220 |
| 2009/0003303 A1 | 1/2009 | Zhu et al. | |
| 2009/0257396 A1* | 10/2009 | Eliezer et al. | 370/330 |
| 2010/0029204 A1* | 2/2010 | Gao et al. | 455/41.2 |

OTHER PUBLICATIONS

"Wireless Networks and Mobile Systems, Lecture 6, 802.11b, Bluetooth and Coexistence", retrieved online May 25, 2009.  
Bar-Shalom, Ofer, "On the Union of WPAN and WLAN in Mobile Computers and Hand-Held Devices", Aug. 2003.  
Broadcom Corporation, "White Paper BCM4325 Bluetooth and WLAN Coexistence", Aug. 2008.  
Chokshi, Ronak, "White Paper: Yes! Wi-Fi and Bluetooth Can Coexist in Handheld Devices", Marvell, Mar. 2010.  
Golmie, N. et al., "Bluetooth and WLAN Coexistence: Challenges and Solutions", Dec. 2003.  
Philips Semiconductors, "How 802.11b/g WLAN and Bluetooth Can Play", Sep. 2005.  
Quinnell, Richard A., "WiFi and Bluetooth fight for bandwidth", Electronics Design, Strategy, News (EDN), Aug. 4, 2005, pp. 73-78.  
Tao, Xiao-Jiao, "Bluetooth-WiFi Coexistence in Mobile Handset", Huawei Technologies Co., Ltd. Apr. 2009.  
Bauer, Fréféric, Extended European Search Report for EP 10192748. 1, Apr. 27, 2011.

(Continued)

*Primary Examiner* — Kenneth Lam  
(74) *Attorney, Agent, or Firm* — Integral Intellectual Property Inc.; Miriam Paton

(57) ABSTRACT

A narrow-channel transmitter in a dual-radio communication device reduces its bandwidth for the benefit of a wide-channel receiver in the dual-radio communication device. Narrow channels are marked as unavailable based on actual off-line adjacent channel rejection 'ACR' information that characterizes tolerance of the wide-channel receiver to adjacent channel interference 'ACI' caused by transmissions from the narrow-channel transmitter.

14 Claims, 7 Drawing Sheets

(56) References Cited

OTHER PUBLICATIONS

Bluetooth Specification, vol. 2 pp. 234-238 Adaptive Frequency Hopping and Channel Classification, Jun. 30, 2010, XP002632271, www.bluetooth.org/Technical/Specifications/adopted.ht.

Ophir, Lior et al., "Wi-Fi (IEEE802.11) and Bluetooth coexistence: issues and solutions", Personal, Indoor and Mobile Radio Communications, 2004. PIMRC 2004. 15 th IEEE International Symposium on Barcelona, Spain vol. 2, pp. 847-852, Sep. 5, 2004.

IEEE 802.11-2007 specification, section 15.4.8.3, "Received adjacent channel rejection", pp. 572-573 (2007).

Barr, John R., "Bluetooth AFH and IEEE 802.15.1-2005", Jan. 20, 2009.

Garcia Villegas, Eduard, "Effect of adjacent-channel interference in IEEE 802.11 WLANs", Aug. 2007.

Hodgdon, Charles, "Adaptive Frequency Hopping for Reduced Interface between Bluetooth® and Wireless LAN", May 2003.

Zyren, Jim, "Reliability of IEEE 802.11 Hi Rate DSSS WLANs in a High Density Bluetooth Environment", Jun. 8, 1999.

Khader, Tariq, First Office Action for CA 2,750,953, Oct. 10, 2012.

* cited by examiner

CO-EXISTENCE OF NARROW-CHANNEL TRANSMITTER AND WIDE-CHANNEL RECEIVER

TECHNICAL FIELD

The technology described herein relates generally to co-located wireless local area network 'WLAN' and Bluetooth® functional modules.

BACKGROUND

Some implementations of dual-radio communication devices equipped with a wireless local area network 'WLAN' and a Bluetooth® 'BT' radio allow for simultaneous operation of both radios. Bluetooth® combats interference by applying adaptive frequency hopping (AFH). The BT radio performs a receive-and-transmit exchange over a 1 MHz channel before hopping to a different channel. Channels with strong interference present are marked as 'bad' and avoided for a certain period of time. In the case of co-located BT radio and WLAN radio, AFH is sufficient to prevent a BT radio from being an in-channel interferer with the WLAN radio which is communicating with an access point in the vicinity. Therefore, adjacent channel interference 'ACI' becomes an important radio frequency metric considered in allowing simultaneous WLAN reception and BT transmission.

BRIEF DESCRIPTION OF THE DRAWINGS

The figures of the accompanying drawings are intended to illustrate by way of example and not limitation. Like reference numbers in the figures indicate corresponding, analogous or similar elements.

FIG. 4-1 is a simplified block diagram of an example system with an example dual-radio communication device and another example communication device, the dual-radio communication device having an integrated circuit on which reside a wide-channel receiver and a narrow-channel transmitter;

FIG. 4-2 is a simplified block diagram of an example system with an example dual-radio communication device and another example communication device, the dual-radio communication device having an integrated circuit on which resides a wide-channel receiver and another integrated circuit on which resides a narrow-channel transmitter;

DETAILED DESCRIPTION

Throughout this document, the term "dual-radio communication device" is defined as "a communication device in which there are two or more radios and transmit operations or receive operations may occur at a first of the radios simultaneously with transmit operations or receive operations at a second of the radios". The use of "wide" and "narrow" in this document is to provide a relative reference, and is not intended to be understood as absolute terms. That is, a "narrow channel" is narrow in the sense that it is narrower than a "wide channel", and a "wide channel" is wide in the sense that it is wider than a "narrow channel". The term "off-line" with respect to the method illustrated in FIG. 2 means that the method is performed in a controlled environment, for example, in a laboratory or by the manufacturer of the dual-radio communication device, by the manufacturer of a part or a sub-assembly to be included in the dual-radio communication device.

A dual-radio communication device includes a receiver operable on wide channels ("wide-channel receiver") and a transmitter operable on narrow channels ("narrow-channel transmitter"). The wide channels and narrow channels are in the same radio frequency band.

Adjacent channel rejection 'ACR' information that characterizes tolerance of the wide-channel receiver to adjacent channel interference 'ACI' caused by transmissions from the narrow-channel transmitter is determined off-line and stored in the dual-radio communication device.

During normal operation of the dual-radio communication device, in the event of reception by the wide-channel receiver of signals over one of the wide channels, the narrow-channel transmitter reduces its bandwidth for the benefit of the wide-channel receiver. Narrow channels are marked as unavailable based on a comparison of actual off-line characteristics for the dual-radio communication device and a current indication of strength of signals received by the wide-channel receiver.

Figure 1:
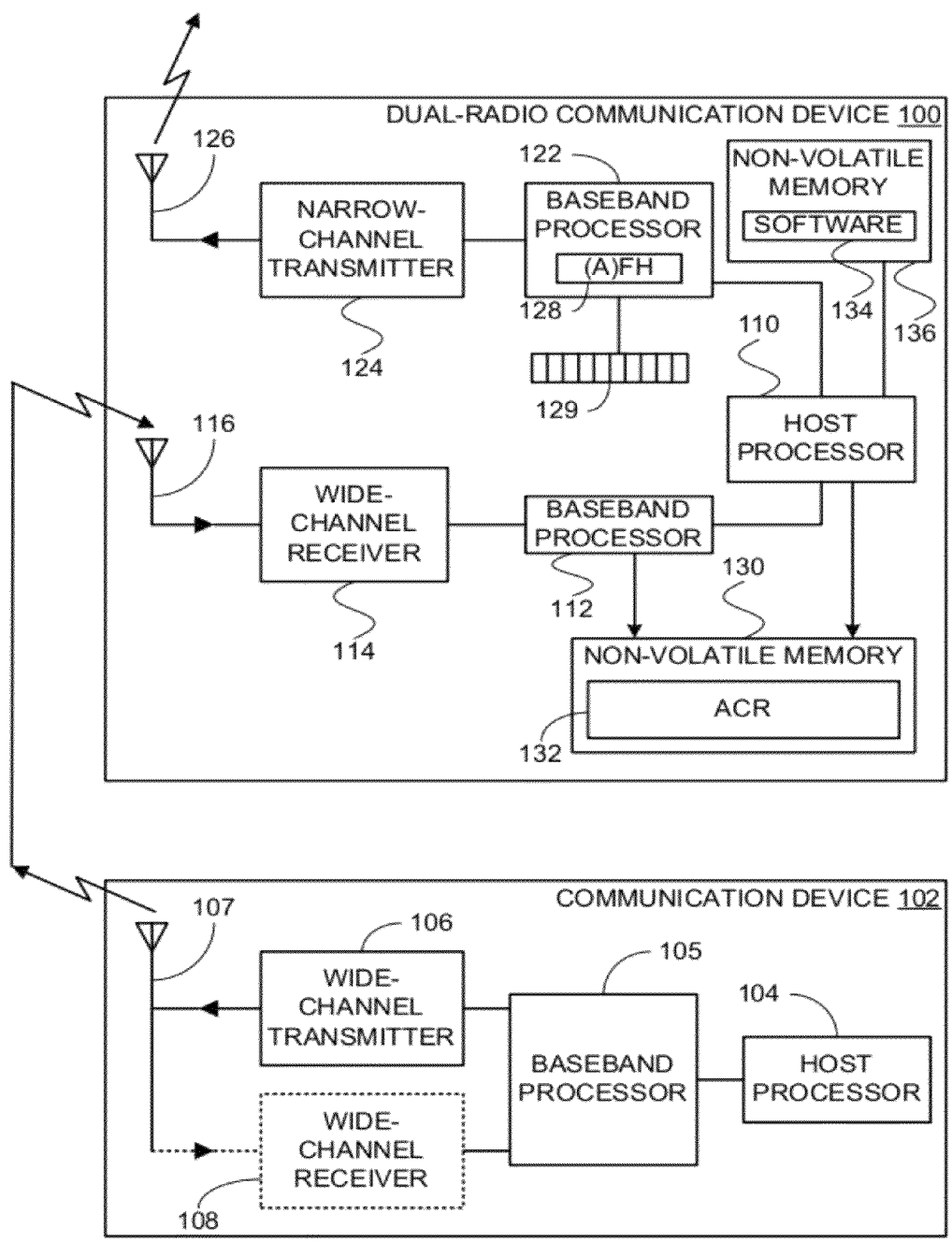
FIG. 1 is a simplified block diagram of an example system with an example dual-radio communication device and another example communication device, the dual-radio communication device including a receiver operable on wide channels ("wide-channel receiver") and a transmitter operable on narrow channels ("narrow-channel transmitter")

FIG. 1 is a simplified block diagram of an example system with an example dual-radio communication device 100 and another example communication device 102.

Communication device 102 comprises a host processor 104, a baseband processor 105 coupled to host processor 104, a transmitter 106 coupled to baseband processor 105, and an antenna 107 coupled to transmitter 106. Communication device 102 may optionally comprise a receiver 108 coupled to antenna 107 and to baseband processor 105. Other components of communication device 102 are not illustrated in FIG. 1, so as not to obscure the description of the technology of interest.

Dual-radio communication device 100 comprises a host processor 110, a baseband processor 112 coupled to host processor 110, a receiver 114 coupled to baseband processor 112, an antenna 116 coupled to receiver 114, a baseband processor 122 coupled to host processor 110, a transmitter 124 coupled to baseband processor 122, and an antenna 126 coupled to transmitter 124. Processors 110, 112 and 122 may be separate physical components. Alternatively, any of processors 110, 112 and 122 may reside in one physical component. In some embodiments, antennae 116 and 126 may be one and the same antenna coupled to both transmitter 124 and receiver 114.

Transmitter 106, optional receiver 108, receiver 114 and transmitter 124 are operable in the same radio frequency band, for example, in the unlicensed industrial, scientific and medical 'ISM' 2.4 GHz band.

Transmitter 106, receiver 114 and optional receiver 108 are operable on wide channels in the radio frequency band. Accordingly, transmitter 106 is occasionally referred to in this document as a "wide-channel transmitter", and receiver 114 and optional receiver 108 are each occasionally referred to in this document as a "wide-channel receiver". Transmitter 106, receiver 114, optional receiver 108, baseband processor 105 and baseband processor 112 may be compatible with wireless local area network technology such as, for example, Institute of Electrical and Electronics Engineers (IEEE) Standard 802.11 (IEEE 802.11) technology, and the wide channels may be channels of approximately 23 MHz width.

Transmitter 124 is operable on narrow channels in the radio frequency band. Accordingly, transmitter 124 is occasionally referred to in this document as a "narrow-channel transmitter". Transmitter 124 and baseband processor 122 may be compatible with wireless personal area network technology, for example, Bluetooth® technology, and the narrow channels may be channels of approximately 1 MHz width.

Isolation between narrow-channel transmitter 124 and wide-channel receiver 114 may refer to the attenuation of signals produced by narrow-channel transmitter 124 on their way to be received by wide-channel receiver 114. The isolation may be referred to as antenna isolation, and if transmitter 124 is a Bluetooth® transmitter and receiver 114 is a wireless LAN receiver, also as BT-to-WLAN antenna isolation. Many factors in the design and manufacture of dual-radio communication device 100, for example physical separation between receiver 114 and transmitter 124 and optional filtering components may affect the actual antenna isolation value AI, which is a measurable quantity.

Baseband processor 122 may implement a frequency-hopping (FH) spread spectrum technique among those of the narrow channels marked in a channel map as available and excluding those of the narrow channels marked in the channel map as unavailable. The frequency-hopping (FH) spread spectrum technique may be implemented through software, firmware, hardware or any combination thereof, and is represented in FIG. 1 as element 128. One or more registers 129 or other suitable memory components coupled to or internal to baseband processor 122 may store the channel map. An example frequency hopping spread-spectrum technique is described in the BLUETOOTH SPECIFICATION Version 4.0 [Vol. 2], Architecture, Baseband Specification, especially section 2.6 pages 83-95, (published 30 Jun. 2010). The frequency-hopping spread-spectrum technique implemented by baseband processor 122 may be an adaptive frequency hopping (AFH) spread-spectrum technique. An example AFH spread-spectrum technique is described in section 4.1.4 of the BLUETOOTH SPECIFICATION Version 4.0 [Vol. 2], Link Manager Protocol Specification, pages 234-236, (published 30 Jun. 2010), and was originally introduced in the BLUETOOTH SPECIFICATION Version 1.2. In that AFH spread-spectrum technique, available channels are marked "good" and unavailable channels are marked "bad".

Figures 1, 4:
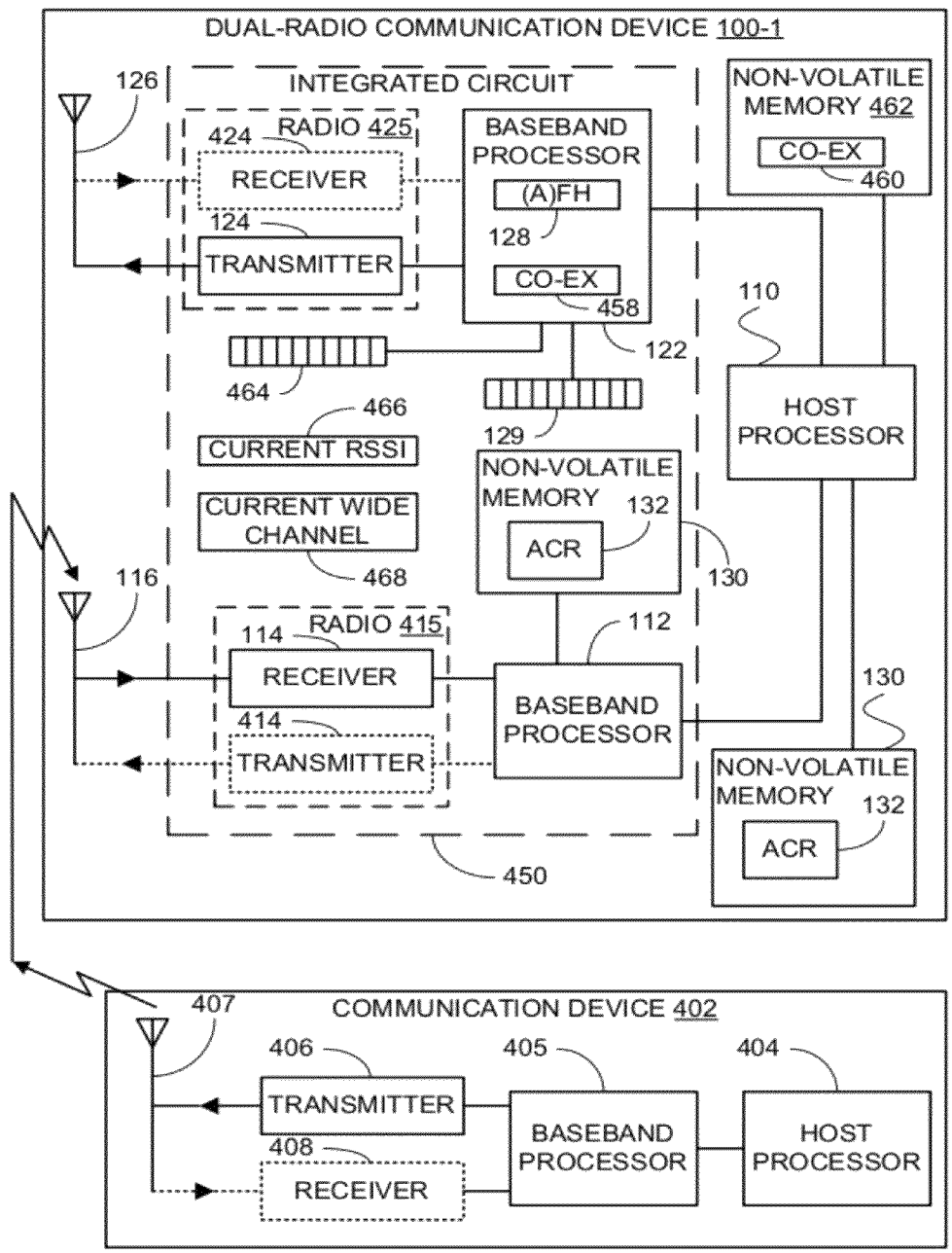
Figures 2, 4:
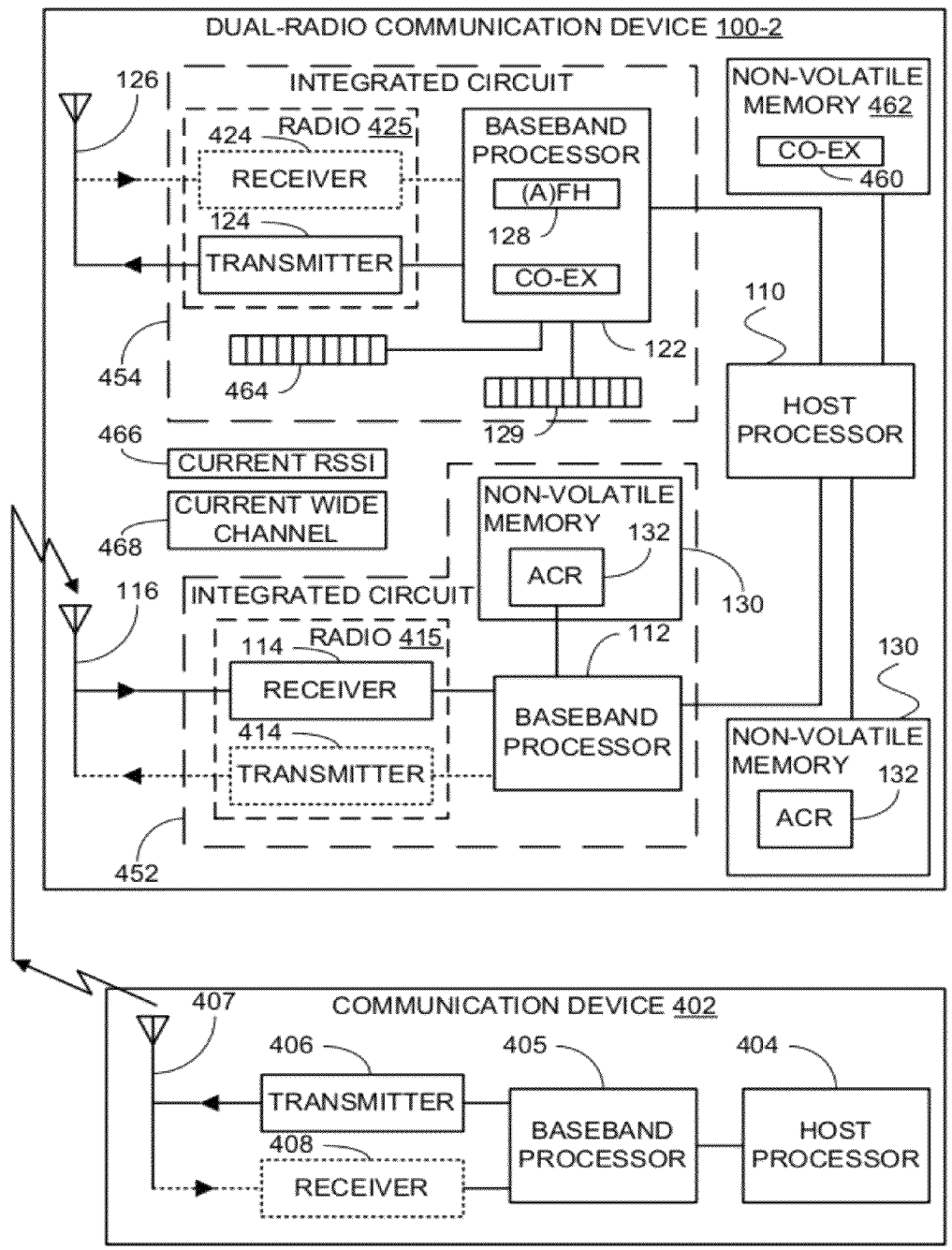

Dual-radio communication device 100 may optionally comprise a wide-channel transmitter coupled to baseband processor 112 and to antenna 116. Dual-radio communication device 100 may optionally comprise a narrow-channel receiver coupled to baseband processor 122 and to antenna 126. These optional components are illustrated in FIG. 4-1 and FIG. 4-2.

Dual-radio communication device 100 comprises a non-volatile memory 130, that is coupled either to host processor 110 or to baseband processor 112, or alternatively is internal to host processor 110 or to baseband processor 112. Examples for non-volatile memory include flash, read-only memory 'ROM', erasable programmable ROM 'EPROM', electrical EPROM 'EEPROM', and the like. Adjacent channel rejection 'ACR' information 132, determined off-line, for example, by a method as described below with respect to FIG. 2, may be stored in non-volatile memory 130. Software 134 to be executed by host processor 110 in order to perform portions of the method described below with respect to FIG. 2 may be stored in a non-volatile memory 136 coupled to host processor 110.

Figure 2:
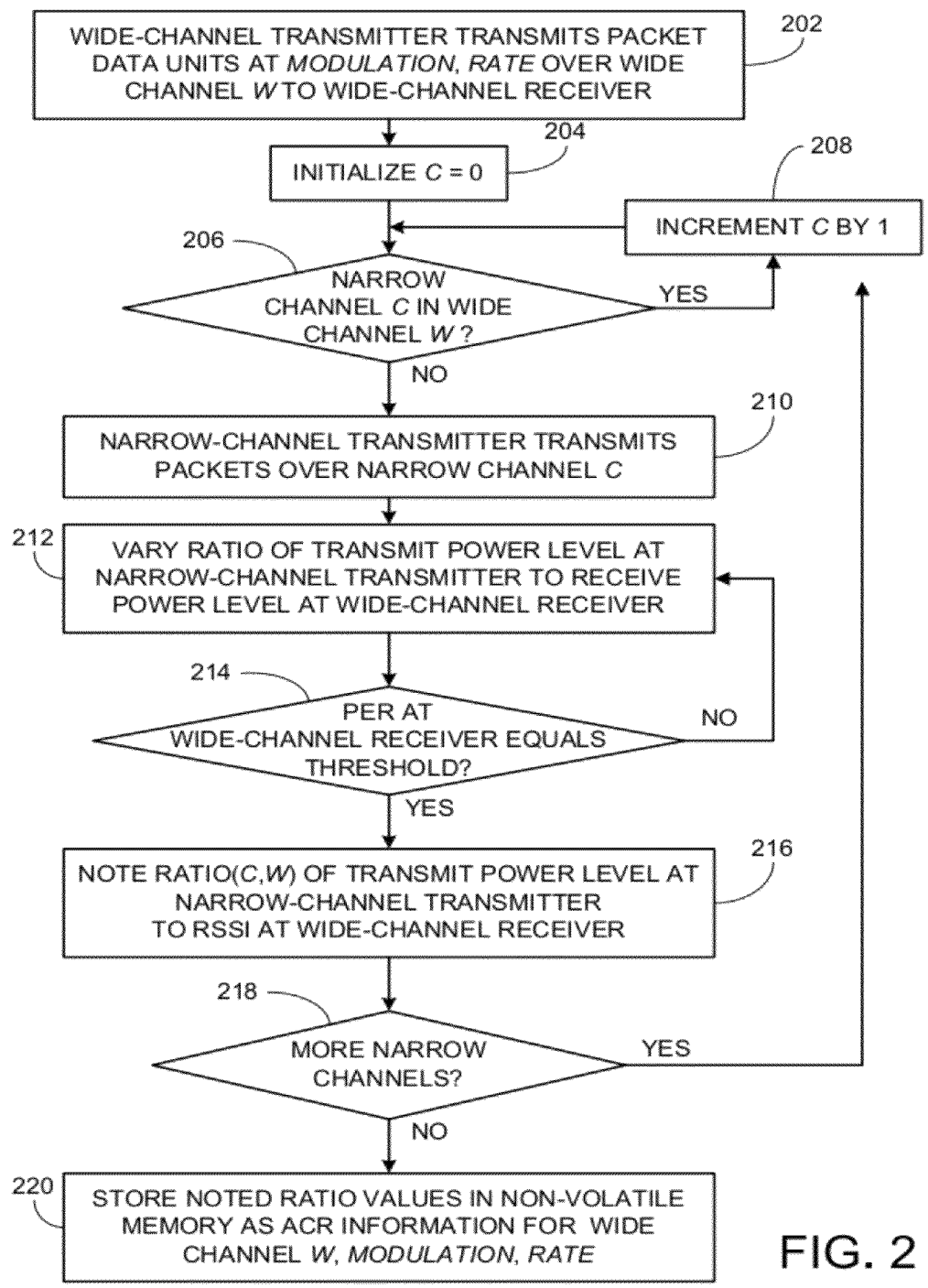
FIG. 2 is a flowchart illustrating an example method for off-line determination of adjacent channel rejection 'ACR' information that characterizes tolerance of the wide-channel receiver to adjacent channel interference 'ACI' caused by transmissions from the narrow-channel transmitter.

FIG. 2 is a flowchart illustrating an example method for off-line determination of adjacent channel rejection 'ACR' information that characterizes tolerance of a wide-channel receiver to adjacent channel interference 'ACI' caused by transmissions from a narrow-channel transmitter, where the wide-channel receiver and the narrow-channel receiver are operable in the same radio frequency band, and the wide-channel receiver and the narrow-channel receiver reside in the same dual-radio communication device.

An ACR measurement procedure is mentioned in section 15.4.8.3, entitled Receiver adjacent channel rejection, of the IEEE 802.11-2007 Standard. The method described herein is a modified version of that procedure.

The method illustrated in FIG. 2 may be performed in a controlled environment, for example, in a laboratory or by the manufacturer of the dual-radio communication device, by the manufacturer of a part or a sub-assembly to be included in the dual-radio communication device, using a system such as illustrated in FIG. 1. For example, a sub-assembly of communication device 100 may include transmitter 124, receiver 114 and antennae 126 and 114 and in some embodiments it may be sufficient or desired to perform an ACR measurement procedure on the subassembly while emulating other portions of the complete device 100, such as processors 128 and 112. In another embodiment, a subassembly of device 100 may additionally include processors 128 and 112. Accordingly, the system shown in FIG. 1 can serve a test environment for performing ACR measurements, while the device under test (DUT) may be device 100 or a subassembly of device 100 and the parts other than the DUT are parts of the test environment.

At 202, wide-channel transmitter 106 in communication device 102 transmits packet data units over a particular wide channel, denoted W, to wide-channel receiver 114 in dual-radio communication device 100. Receiver 114 is configured to receive packet data units over particular wide channel W. An indication of particular wide channel W is made available to host processor 110.

The packet data units are modulated for transmission at transmitter 106 and are de-modulated at receiver 114 upon receipt. Differential Quadrature Phase Shift Keying (DQPSK) is an example of a modulation technique that may be used by transmitter 106 and receiver 114. Other modulation techniques may be used. The packet data units are transmitted and received at a particular data rate that is known to transmitter 106 and receiver 114. 2 Mbps (Mega bits per second) is an example of a data rate that may be used, although other rates are contemplated. The method illustrated in FIG. 2 may be repeated for different modulation techniques, may be repeated for different rates, and may be repeated for different wide channels.

At 204, an index C representing a narrow channel is initialized, for example, to the value zero, by host processor 110 executing software 134. At 206, host processor 110 checks whether narrow channel C is in wide channel W. That is, narrow channel C is in wide channel W if the frequencies of narrow channel C are contained within the frequencies of wide channel W. For example, IEEE 802.11 channel 6, centered at 2.437 GHz, extends from 2.426 GHz to 2.448 GHz, Bluetooth® channels 24 through 46 are in IEEE 802.11 channel 6, and Bluetooth® channels 0 through 23 and 47 through 78 are not in IEEE 802.11 channel 6.

If narrow channel C is in wide channel W, then at 208 host processor 110 increments index C by one, and the new narrow channel C is checked at 206. In other words, the rest of the method is not performed for narrow channels that are in wide channel W, because the method relates to adjacent channel interference and adjacent channel rejection.

If narrow channel C is not in wide channel W, then at 210, host processor 110 controls baseband processor 122 to cause narrow-channel transmitter 124 to start transmitting packets one at a time via antenna 126 over narrow channel C. There is therefore simultaneous reception by wide-channel receiver 114 and transmission by narrow-channel transmitter 124.

At 212, the ratio of the transmit power level of narrow-channel transmitter 124 to the receive power level of wide-channel receiver 114 is varied. This may be accomplished by keeping the transmit power level of wide-channel transmitter 106 at a fixed value and varying the transmit power level of narrow-channel transmitter 124. Alternatively, this may be accomplished by varying both transmit power levels. Alternatively, this may be accomplished by keeping the transmit power level of narrow-channel transmitter 124 at a fixed value and varying the transmit power level of wide-channel transmitter 106. For example, the transmit power level of narrow-channel transmitter 124 may be set to its maximum transmission power, such that the level of interference from narrow-channel transmitter 124 at wide-channel receiver 114 is equal to the maximum transmit power level of narrow-channel transmitter 124 less the antenna isolation value that characterizes the effect of antenna 126 on antenna 116. As a more detailed example, the maximum transmit power level of narrow-channel transmitter 124 may be 0 dBm and the antenna isolation value may be 20 dB, so the transmit power level of narrow-channel transmitter 124 may be set such that the level of interference from narrow-channel transmitter 124 at wide-channel receiver 114 is equal to −20 dBm. In another example, the transmit power level of narrow-channel transmitter 124 may be set to a transmission power lower than its maximum transmission power.

The ratio is varied until, as checked at 214, a packet error rate (PER) experienced by baseband processor 112 reaches a threshold such as a highest value at which successful decoding is possible, for example, 8%. At that point, the ratio r(C,W) of the transmit power level of narrow-channel transmitter 124 to the received signal strength indicator (RSSI) value at wide-channel receiver 114 is noted at 216, by baseband processor 112 or by host processor 110 or by both. This value characterizes the ability of wide-channel receiver 114 to reject adjacent channel interference 'ACI' caused by transmissions from narrow-channel transmitter 124 on narrow channel C when receiving communications over wide channel W at the particular modulation technique and the particular data rate. In other words, if a packet data unit decoded by baseband processor at the particular data rate and using the particular modulation technique is received by wide-channel receiver over wide channel W at a particular strength, it will be decoded correctly if the ratio of the interference due to transmissions from narrow-channel transmitter 124 on narrow channel C to the particular strength was no greater than the ratio noted at 216.

At 218, host processor 110 checks whether there are more narrow channels to be considered. If there are more narrow channels to be considered, host processor 110 increments index C by one at 208 and the new narrow channel C is checked at 206. If there are no more narrow channels to be considered, then at 220 the collection of noted ratio values is stored in non-volatile memory 132 as ACR information 132 for wide channel W, the particular modulation technique, and the particular data rate.

Modifications of the method illustrated in FIG. 2 will be obvious to a person of ordinary skill in the art. For example, the narrow channels need not be considered in any particular order. In another example, host processor 110 may consider only a subset of the narrow channels. In a further example, host processor 110 may exclude narrow channels that are in wide channel W from consideration, rather than explicitly conducting the test at 206.

As expected, for a given wide channel W, a particular modulation technique and a particular data rate, the noted ratio values will be different for different narrow channels C. Surprisingly, however, the noted ratio values do not monotonically increase the farther narrow channel C is from the central frequency of wide channel W. Due to the inherent non-linearity of wide-channel receiver 114, it is possible that wide-channel receiver 114 will have better rejection of adjacent channel interference at a narrow channel that is closer to the central frequency of wide channel W than at a narrow channel that is farther from the central frequency of wide channel W.

Figure 3:
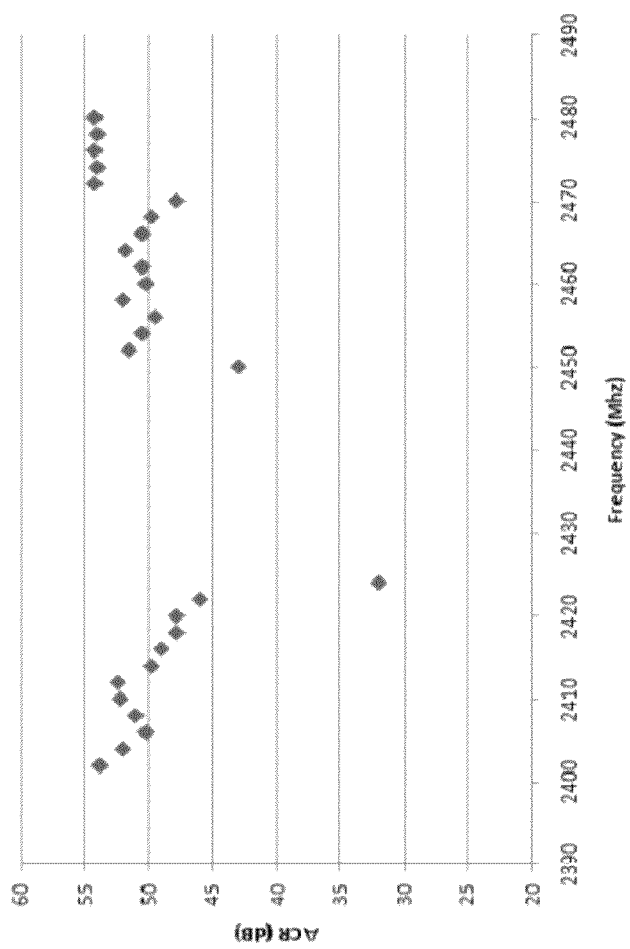
FIG. 3 is a plot of example ACR information for the wide-channel receiver operating on a particular wide channel in the presence of ACI due to transmissions from the narrow-channel transmitter.

FIG. 3 is a plot of example ACR information for wide-channel receiver 114 operating on a particular wide channel (2426 MHz-2448 MHz) in the presence of ACI due to transmissions from narrow-channel transmitter 124. Narrow channels 2410 MHz and 2412 MHz are closer to the central frequency (2437 MHz) of wide channel W than narrow channel 2406 MHz, and yet wide-channel receiver 114 has better rejection of ACI due to transmission by narrow-channel transmitter 124 at narrow channels 2410 MHz and 2412 MHz than at narrow channel 2406 MHz. Narrow channels 2452 MHz through 2468 MHz are closer to the central frequency (2437 MHz) of wide channel W than narrow channel 2470 MHz, and yet wide-channel receiver 114 has better rejection of ACI due to transmission by narrow-channel transmitter 124 at narrow channels 2452 MHz through 2468 MHz than at narrow channel 2470 MHz.

FIG. 4-1 is a simplified block diagram of an example system with an example dual-radio communication device 100-1 and another example communication device 402. Dual-radio communication device 100-1 is an example of dual-radio communication device 100. FIG. 4-2 is a simplified block diagram of an example system with an example dual-radio communication device 100-2 and communication device 402. Dual-radio communication device 100-2 is another example of dual-radio communication device 100.

Communication device 402 comprises a host processor 404, a baseband processor 405 coupled to host processor 404, a transmitter 406 coupled to baseband processor 405, and an antenna 407 coupled to transmitter 406. Communication device 402 may optionally comprise a receiver 408 coupled to antenna 407 and to baseband processor 405. Other components of communication device 402 are not illustrated in FIG. 4-1 and FIG. 4-2, so as not to obscure the description of the technology of interest.

Transmitter 406, optional receiver 408, receiver 114 and transmitter 124 are operable in the same radio frequency band, for example, in the unlicensed industrial, scientific and medical 'ISM' 2.4 GHz band. Transmitter 406 and optional receiver 408 are operable on wide channels in the radio frequency band. Accordingly, transmitter 406 is occasionally referred to in this document as a "wide-channel transmitter", and optional receiver 408 is occasionally referred to in this document as a "wide-channel receiver". Transmitter 406, optional receiver 408, and baseband processor 405 may be compatible with wireless local area network technology such as, for example, IEEE 802.11 technology, and the wide channels may be channels of approximately 23 MHz width.

Dual-radio communication device 100-1 or 100-2 or both may optionally comprise a wide-channel transmitter 414 coupled to baseband processor 112 and to antenna 116, thus forming a radio transceiver 415. Dual-radio communication device 100-1 or 100-2 or both may optionally comprise a narrow-channel receiver 424 coupled to baseband processor 122 and to antenna 126, thus forming a radio transceiver 425.

In the example illustrated in FIG. 4-1, dual-radio communication device 100-1 comprises an integrated circuit 450 on which reside baseband processor 112, receiver 114, optional transmitter 414, baseband processor 122, transmitter 124, optional receiver 424, and register 129. Non-volatile memory 130 storing ACR information 132 is illustrated twice in FIG. 4-1, because it may reside on integrated circuit 450, coupled to baseband processor 112, or it may reside elsewhere in dual-radio communication device 100-1, coupled to host processor 110.

In the example illustrated in FIG. 4-2, dual-radio communication device 100-2 comprises an integrated circuit 452 on which reside baseband processor 112, receiver 114, and optional transmitter 414, and an integrated circuit 454 on which reside baseband processor 122, transmitter 124, optional receiver 424, and register 129. Non-volatile memory 130 storing ACR information 132 is illustrated twice in FIG. 4-2, because it may reside on integrated circuit 452, coupled to baseband processor 112, or it may reside elsewhere in dual-radio communication device 100-2, coupled to host processor 110.

Figure 7:
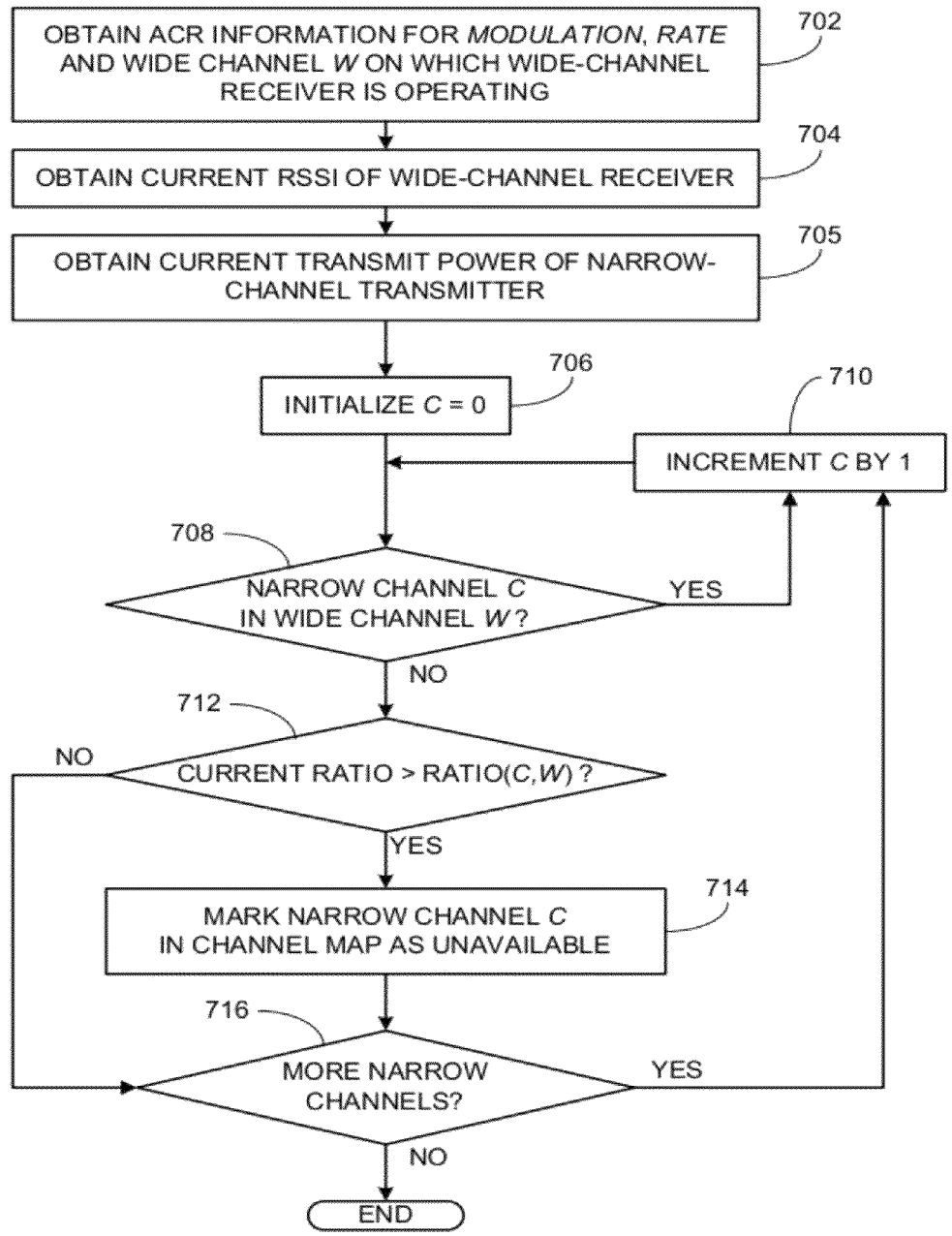
FIG. 7 is a flowchart illustrating an example co-existence method to be implemented by a co-existence mechanism (embodied as software or firmware or hardware or any combination thereof) in a dual-radio communication device having a wide-channel receiver and a narrow-channel transmitter.

A co-existence technique, described in further detail with respect to FIG. 7 and FIG. 7, may be implemented by baseband processor 122 through software, firmware, hardware or any combination thereof, and is represented in FIG. 4-1 and FIG. 4-2 as element 458. Alternatively, the co-existence technique may be implemented through execution by host processor 110 of software 460, stored in a non-volatile memory 462 that is coupled to host processor 110.

If implemented by baseband processor 122, the co-existence technique involves access by baseband processor 122 to a portion of ACR information 132. To that end, a register 464 or other suitable memory component is coupled to baseband processor 122 and can store a copy of the portion for quick access by baseband processor 122. In the example illustrated in FIG. 4-1, register 464 resides on integrated circuit 450. In the example illustrated in FIG. 4-2, register 464 resides on integrated circuit 454.

The co-existence technique also involves baseband processor 112 making available to baseband processor 122 or to host processor 110 or to both an indication of a current wide channel on which receiver 114 is operating and an indication of the strength of the signals as received by receiver 114. To that end, registers 466 and 468 are provided. In the example illustrated in FIG. 4-1, registers 466 and 468 reside on integrated circuit 450. Other architectures are contemplated, including, for example, that the indications are stored in random-access memory (not shown) accessible by baseband processor 110. In the example illustrated in FIG. 4-2, the indications are stored in random-access memory (not shown) accessible by host processor 110.

Figure 5:
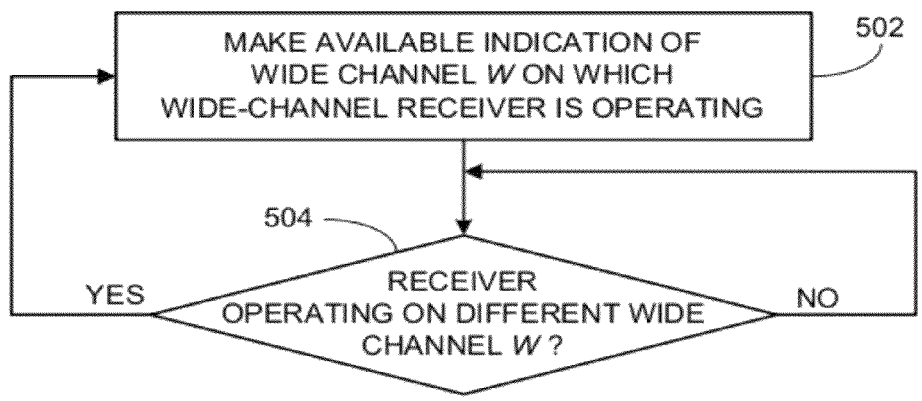
FIGS. 5 and 6 are flowcharts illustrating example methods to be implemented by a dual-radio communication device having a wide-channel receiver and a narrow-channel transmitter.
Figure 6:
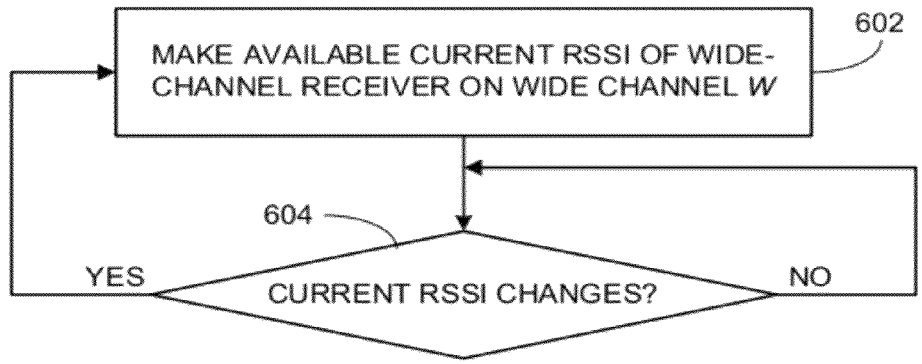

FIGS. 5 and 6 are flowcharts illustrating example methods to be implemented by a dual-radio communication device having a wide-channel receiver and a narrow-channel transmitter. The methods are implemented, for example, in the event of reception by receiver 114 of signals over one of the wide channels. At 502, baseband processor 112 makes available an indication of a current wide channel on which receiver 114 is operating, for example, by writing the indication to register 468. If receiver 114 stops operating on that wide channel and starts operating on a different wide channel, as checked at 504, the method returns to 502, where baseband processor 112 makes available an indication of the new current wide channel on which receiver 114 is operating. At 602, baseband processor 112 makes available an indication of the strength of the signals as received by receiver 114 over the current wide channel, for example, by writing the indication to register 466. Received signal strength indicator (RSSI) is an example of the indication. If the current strength of the signals as received by receiver 114 over the current wide channel changes, as checked at 604, the method returns to 602, where baseband processor 112 makes available an indication of the new strength of the signals. These indications are made available to baseband processor 122 or to host processor 110 or to both.

FIG. 7 is a flowchart illustrating an example co-existence method to be implemented by a co-existence mechanism (embodied as software or firmware or hardware or any combination thereof) in a dual-radio communication device having a wide-channel receiver and a narrow-channel transmitter. As noted above, the methods may be implemented by baseband processor 122 or by host processor 110. It is contemplated that the example methods are not performed while the wide-channel receiver is scanning for networks.

At 702, baseband processor 122 or host processor 110 obtains the portion of ACR information 132 that is applicable to the modulation technique and data rate currently being used by baseband processor 112 and that is applicable to the wide channel W an indication of which has been made available by baseband processor 112. For example, host processor 110 may simply read ACR information 132 from non-volatile memory 130. In another example, a copy of the portion of the ACR information 132 may be stored in register 464 or in any other suitable memory component that is coupled to baseband processor 122. Host processor 110 may read ACR information 132 from non-volatile memory 130 and write the portion to register 464 or the other suitable memory component that is coupled to baseband processor 122.

At 704, baseband processor 122 or host processor 110 obtains the current indication of the strength of the signals as received by receiver 114, for example, the current RSSI, by reading register 466. At 705, baseband processor 122 or host processor 110 obtains the current transmit power level of narrow-channel transmitter 124.

At 706, an index C representing a narrow channel is initialized, for example, to the value zero. At 708, baseband processor 122 or host processor 110 checks whether narrow channel C is in wide channel W. That is, narrow channel C is in wide channel W if the frequencies of narrow channel C are contained within the frequencies of wide channel W.

If narrow channel C is in wide channel W, then at 710 baseband processor 122 or host processor 110 increments index C by one, and the new narrow channel C is checked at 708. In other words, the rest of the method is not performed for narrow channels that are in wide channel W, because the method relates to adjacent channel interference and adjacent channel rejection.

If narrow channel C is not in wide channel W, then baseband processor 122 or host processor 110 checks at 712 whether the ratio of the current transmit power level of narrow-channel transmitter 124 to the current indication of the strength of the signals as received by receiver 114 is greater than the ACR information for narrow channel C and wide channel W. As mentioned above, the ACR information for narrow channel C and wide channel W may be a ratio value determined off-line. For example, the test may be expressed as: current_ratio<ratio(C,W)? where current_ratio is the ratio of the current transmit power level of narrow-channel transmitter 124 to the current indication of the strength of the signals as received by receiver 114.

If the ratio of the current transmit power level of narrow-channel transmitter 124 to the current indication of the strength of the signals as received by receiver 114 is greater than the ACR information for narrow channel C and wide channel W, then at 714, baseband processor 122 or host processor 110 marks narrow channel C in the channel map as unavailable.

At 716, baseband processor 122 or host processor 110 checks whether there are more narrow channels to be considered. If there are more narrow channels to be considered, baseband processor 122 or host processor 110 increments index C by one at 710 and the new narrow channel C is checked at 708. If there are no more narrow channels to be considered, then the method ends.

The method may be repeated starting from 704 every time the channel map is updated, which is a configurable parameter.

Modifications of the example method illustrated in FIG. 7 will be obvious to a person of ordinary skill in the art. For example, the narrow channels need not be considered in any particular order. In another example, baseband processor 122 or host processor 110 may consider only a subset of the narrow channels. In a further example, baseband processor 122 or host processor 110 may exclude narrow channels that are in wide channel W from consideration, rather than explicitly conducting the test at 708.

With the co-existence technique and mechanism described herein, the narrow-channel transmitter in a dual-radio communication device reduces its bandwidth for the benefit of the wide-channel receiver in the dual-radio communication device. Narrow channels are marked as unavailable based on actual off-line characteristics for the dual-radio communication device. Which narrow channels are marked as unavailable may differ from one dual-radio communication device to another, even if both dual-radio communication devices are operating in the same wide channel.

As discussed thus far, the off-line characteristics are determined using empirical measurements. As a modification, the off-line characteristics may be determined, in whole or in part, by any combination of the following techniques: empirical measurements, analytical calculations, simulations.

An alternative to the co-existence technique and mechanism described herein is to mark adjacent narrow channels as unavailable or available solely on the basis of their proximity to the central frequency of a wide channel. This alternative may result in a narrow channel being unnecessarily marked as unavailable, if the tolerance of the wide-channel receiver to ACI is actually quite good at that narrow channel despite the proximity of that narrow channel to the central frequency of a wide channel. This alternative may also result in a narrow channel at which the tolerance of the wide-channel receiver to ACI is poor to not be marked as unavailable, and if the narrow-channel transmitter transmits on that narrow channel, the wide-channel receiver may have difficulty in successfully decoding received signals.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A communication device comprising:
a processor;
a receiver operable in wide channels in a radio frequency band;
a first antenna coupled to the receiver;
a transmitter coupled to the processor, the transmitter operable in narrow channels in the radio frequency band, the processor implementing a frequency hopping spread-spectrum technique among those of the narrow channels marked in a channel map as available and excluding those of the narrow channels marked in the channel map as unavailable;
a second antenna coupled to the transmitter; and
non-volatile memory storing adjacent channel rejection 'ACR' information that characterizes tolerance of the receiver to adjacent channel interference 'ACI' caused by transmissions from the transmitter through the second antenna,
wherein in the event of reception by the receiver of signals over one of the wide channels, the communication device is to mark in the channel map as unavailable one or more of the narrow channels outside the one of the wide channels, based on the ACR information, on the transmit power of the transmitter, and on the strength of the signals as received by the receiver on the one of the wide channels.

2. The communication device as claimed in claim 1, wherein the radio frequency band is in the unlicensed industrial, scientific and medical 'ISM' 2.4 GHz band.

3. The communication device as claimed in claim 2, wherein the receiver is a wireless local area network 'WLAN' receiver and a width of the wide channels equals 23 MHz.

4. The communication device as claimed in claim 2, wherein the transmitter is a wireless personal area network 'WPAN' transmitter and a width of the narrow channels equals 1 MHz.

5. The communication device as claimed in claim 1, wherein the frequency hopping spread-spectrum technique is an adaptive frequency hopping spread-spectrum technique.

6. The communication device as claimed in claim 1, wherein the processor has access to the ACR information.

7. The communication device as claimed in claim 1, the ACR information comprising for a particular one of the narrow channels a maximum ratio of transmission power level to received signal strength indicator 'RSSI' value at which a signal received on the one of the wide channels in the presence of interference from the transmitter transmitting on the particular one of the narrow channels will be decoded correctly.

8. The communication device as claimed in claim 1, the ACR information comprising for a particular one of the narrow channels a maximum ratio of transmission power level to received signal strength indicator 'RSSI' value at which a signal received on the one of the wide channels in the presence of interference from the transmitter transmitting on the particular one of the narrow channels will be decoded correctly, wherein the particular one of the narrow channels is marked in the channel map as unavailable where the ratio of the transmit power level of the transmitter to the strength is greater than the maximum ratio.

9. The communication device as claimed in claim 1, further comprising:
a transmitter coupled to the first antenna and able to operate in the wide channels.

10. The communication device as claimed in claim 1, further comprising:
a receiver coupled to the second antenna and able to operate in the narrow channels.

11. A co-existence method comprising:
obtaining a current indication of strength of signals as received by a receiver in a communication device through a first antenna over a wide channel in a radio frequency band;
obtaining adjacent channel rejection 'ACR' information applicable to a modulation technique and data rate currently being used for the receiver, the 'ACR' information characterizing tolerance of the receiver when operated in the wide channel to adjacent channel interference 'ACI' caused by transmissions by a transmitter in the communication device through a second antenna over a narrow channel in the radio frequency band that is not in the wide channel; and
marking the narrow channel in a channel map as unavailable if the 'ACR' information is less than a ratio of a current transmit power level of the transmitter to the current indication of strength of signals.

12. The method as claimed in claim 11, wherein the radio frequency band is in the unlicensed industrial, scientific and medical 'ISM' 2.4 GHz band.

13. The method as claimed in claim 12, wherein the receiver is a wireless local area network 'WLAN' receiver and a width of the wide channels equals 23 MHz.

14. The method as claimed in claim 12, wherein the transmitter is a wireless personal area network 'WPAN' transmitter and a width of the narrow channels equals 1 MHz.

* * * * *